(12) United States Patent
Muster et al.

(10) Patent No.: US 6,827,093 B2
(45) Date of Patent: Dec. 7, 2004

(54) OPTICAL LENS STEAM CLEANING APPARATUS AND METHOD OF USING THE SAME

(75) Inventors: Kenneth F. Muster, Yorba Linda, CA (US); Scott L. Pool, Laguna Hills, CA (US)

(73) Assignee: Lens Technology I, LLC, La Mirada, CA (US)

( * ) Notice: Subject to any disclaimer, the term of this patent is extended or adjusted under 35 U.S.C. 154(b) by 34 days.

(21) Appl. No.: 10/294,505

(22) Filed: Nov. 14, 2002

(65) Prior Publication Data

US 2004/0094184 A1 May 20, 2004

(51) Int. Cl.[7] .............................. B08B 3/02; B23Q 1/64
(52) U.S. Cl. ........................ 134/153; 134/157; 269/57; 269/77; 451/42; 451/384
(58) Field of Search .......................... 134/95.3, 102.2, 134/148, 153, 157; 269/55, 57, 71, 77; 451/42, 364, 384

(56) References Cited

U.S. PATENT DOCUMENTS

| | | | | |
|---|---|---|---|---|
| 4,828,276 A | * | 5/1989 | Link et al. .................... 279/33 |
| 5,421,056 A | * | 6/1995 | Tateyama et al. ............. 15/302 |
| 5,556,085 A | * | 9/1996 | Cyr .............................. 269/75 |
| 5,916,366 A | * | 6/1999 | Ueyama et al. ............... 118/52 |
| 5,954,072 A | * | 9/1999 | Matusita ..................... 134/149 |
| 5,988,191 A | * | 11/1999 | Duncan ...................... 134/149 |

* cited by examiner

Primary Examiner—Frankie L. Stinson
Assistant Examiner—Joseph Perrin
(74) Attorney, Agent, or Firm—Stetina Brunda Garred & Brucker

(57) ABSTRACT

A cleaning apparatus for a lens defining opposed top and bottom surfaces and a peripheral edge. The cleaning apparatus comprises a rotatable base having a plurality of arms pivotally connected thereto and rotatable therewith. The arms are configured to releasably engage the peripheral edge of the lens. The cleaning apparatus further comprises a steam conduit including a dispensing nozzle which is selectively positionable in a prescribed orientation relative to the lens mounted within the arms, the dispensing nozzle being operative to propel steam towards at least one of the top and bottom surfaces of the lens while the lens is being spun by the rotation of the base and the arms.

23 Claims, 3 Drawing Sheets

OPTICAL LENS STEAM CLEANING APPARATUS AND METHOD OF USING THE SAME

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to optical lens manufacturing devices and methodologies and, more particularly, to a steam cleaning apparatus for removing residue from an optical lens, such as an eyeglass lens.

In the art of optometry, it is known that the process for grinding the prescription on an optical lens, such as an eyeglass lens, involves the initial step of affixing the lens to a chuck, a process typically referred to as "blocking". The affixation or mounting of the lens to the chuck is typically accomplished through the use of a wax or alloy material. When wax is employed, the front surface of the lens is typically forced into direct, abutting contact with the wax material included on the chuck. The adhesion between the front surface of the lens and the wax material effectively affixes the lens to the chuck, thereby allowing the lens to be subjected to subsequent grinding and polishing operations. During the polishing operation, wax particles can break free, with such wax particles contaminating the polish and being deposited on the lens surfaces during the polishing process. Upon the completion of these operations, the lens is de-blocked, i.e., removed from the chuck. However, upon such de-blocking, the wax material typically leaves a residue on the front surface of the lens that is difficult to remove. In addition, residual polish material often remains on the lens and is itself difficult to remove. Additionally, it is known that many lenses are subjected to a coating process after being de-blocked. As will be recognized, any wax residue or polish residue remaining on the lens can cause substantial defects in such coating process, thus necessitating thorough removal of such wax or polish residue from the lens prior to any coating process being initiated.

A current industry practice is to remove the wax and polish residue from the surfaces of the lens by hand. More particularly, the method involves filling a container with a cleaner, and thereafter dipping the lens into the cleaner. The cleaner is effective in removing the wax residue from the lens. However, over time, there is a tendency for a film residue to form on the top surface of the cleaner within the container. This film residue upon the cleaner subjects lenses dipped therein to contamination or re-contamination when pulled out of the cleaner after the initial dip. This susceptibility is only mitigated by frequently changing the cleaner within the container, which is costly. Moreover, the manual, hand-dipping process itself is labor intensive, time consuming, and therefore expensive. Though hand cleaning of the lens through the use of a sponge or brush is sometimes practiced as an alternative cleaning method, this process is also labor intensive, time consuming, and thus costly.

The present invention addresses these deficiencies by providing an apparatus for cleaning residue remaining on a de-blocked optical lens. The apparatus, and related method of using the same, effectively decreases the time required for cleaning a lens, in addition to minimizing risks of lens contamination. These, as well as other features and advantages of the present invention, will be discussed in more detail below.

BRIEF SUMMARY OF THE INVENTION

In accordance with the present invention, there is provided a cleaning apparatus for a lens which defines opposed top and bottom surfaces and a peripheral edge. The cleaning apparatus comprises a rotatable base having a plurality of arms which are pivotally connected to the base and rotatable therewith. The arms are configured to releasably engage the peripheral edge of the lens. The cleaning apparatus further comprises a means for propelling a heated medium towards at least one of the top and bottom surfaces of the lens while the lens is being spun by the rotation of the base and the arms. Such means may comprise a steam conduit which includes a dispensing nozzle selectively positionable in a prescribed orientation relative to the lens mounted within the arms. In this regard, steam may be employed as the heated medium, with such steam optionally being mixed with a detergent.

Further in accordance with the present invention, there is provided a method of cleaning a de-blocked lens having opposed top and bottom surfaces and a peripheral edge. The method comprises the initial step of releasably engaging the peripheral edge of the lens with a gripper mechanism. Thereafter, the lens is rotated, with a heated medium (e.g., steam mixed with detergent) being applied to at least one of the top and bottom surfaces of the lens while the lens is rotating. The method may further comprise the optional step of rinsing the lens with water subsequent to the completion of the steam cleaning and polishing operation.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
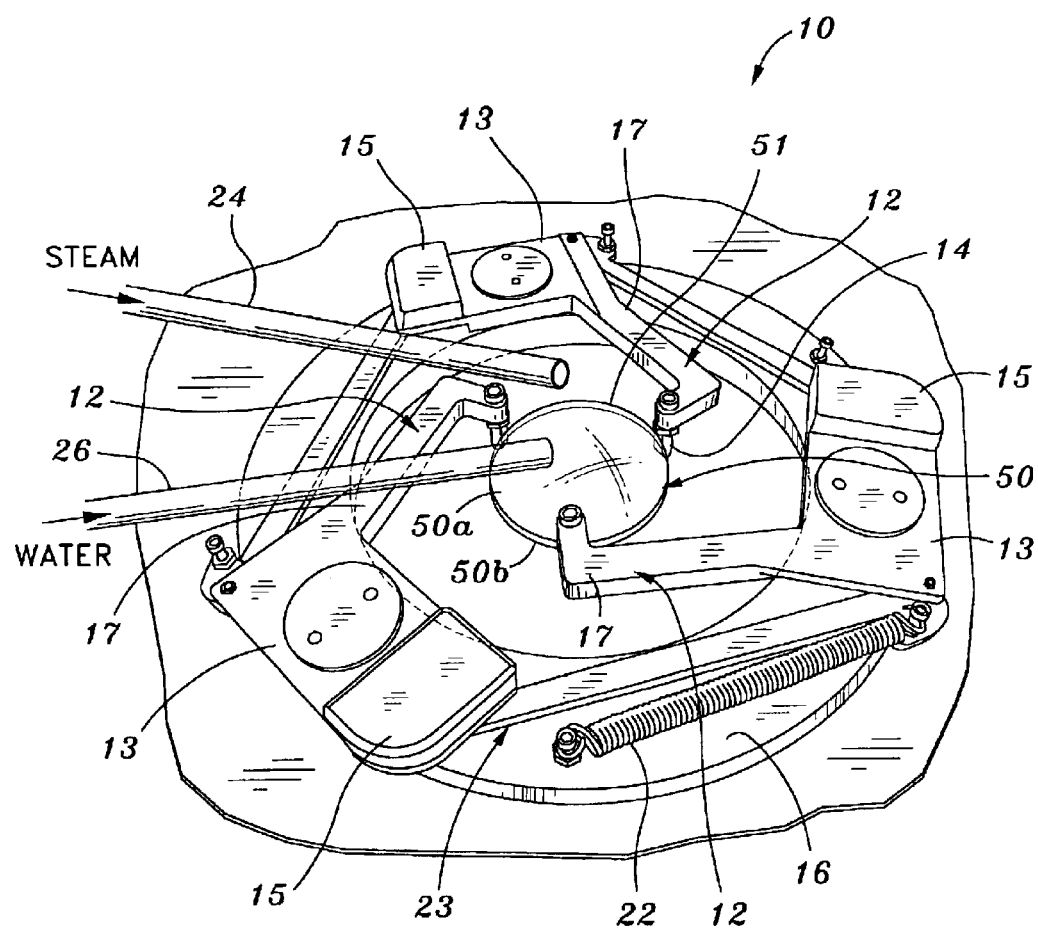
FIG. 1 is a top perspective view of an optical lens cleaning apparatus constructed in accordance with the present invention.
Figure 2:
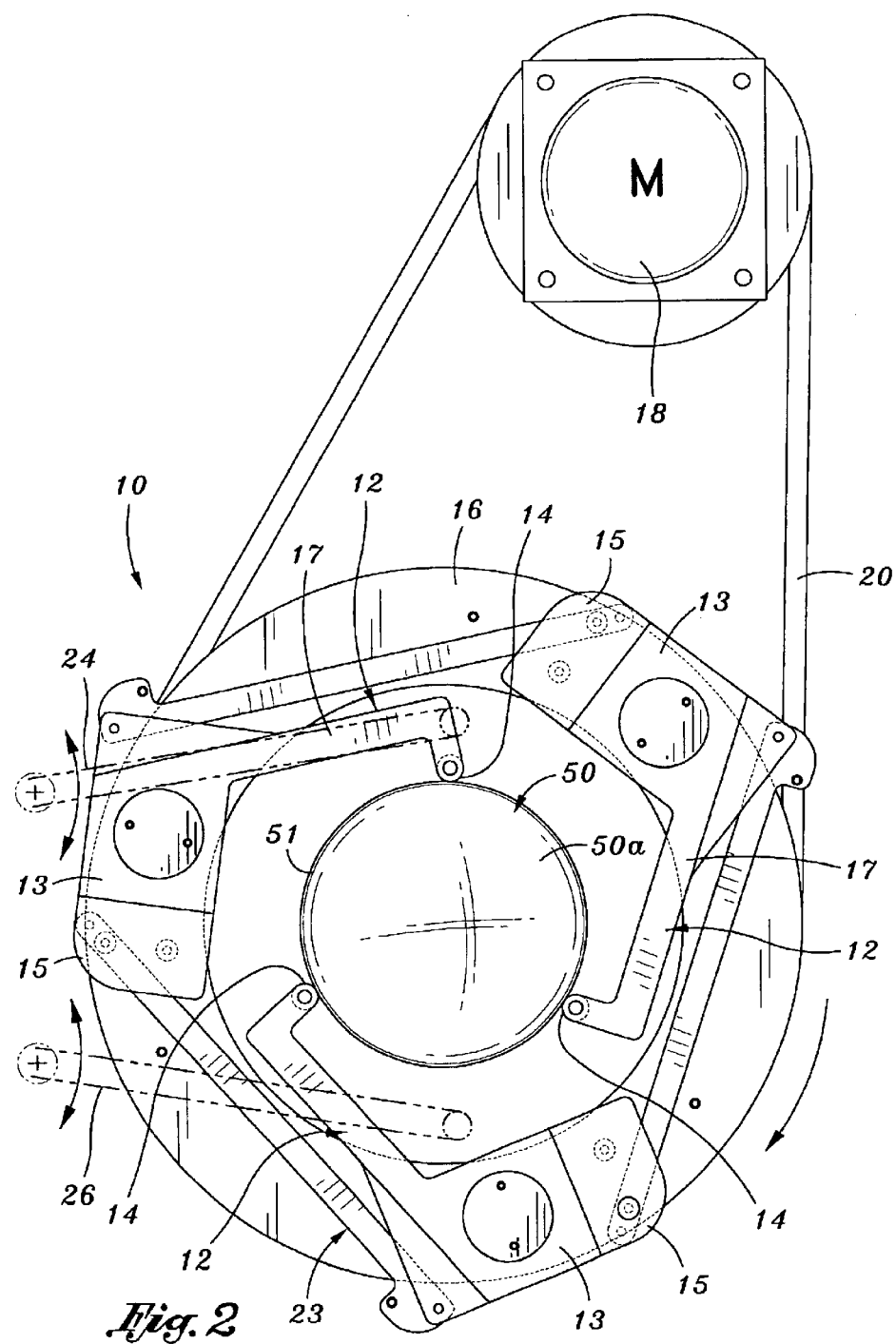
FIG. 2 is a top plan view of the optical lens cleaning apparatus shown in FIG. 1.

Referring now to the drawings wherein the showings are for purposes of illustrating preferred embodiments of the present invention only, and not for purposes of limiting the same, FIGS. 1 and 2 are perspective and top views, respectively, of an optical lens cleaning apparatus 10 constructed in accordance with the present invention. As will be discussed in more detail below, the apparatus 10 is used to remove wax and polish residue and/or other contaminants from a de-blocked optical lens 50, thus properly preparing the lens 50 for a subsequent coating or inspection operation. The cleaning apparatus 10 is effective in removing wax, polish, fingerprints, grease, oil, and inorganic material from the lens 50, including the front and back surfaces 50a, 50b and peripheral edge 51 thereof.

The cleaning apparatus 10 of the present invention comprises an annular, ring-like base 16 which defines opposed, generally planar top and bottom surfaces. In the cleaning apparatus 10, the base 16 is rotatable, and is mounted to a bearing system to facilitate such rotation. This bearing system includes inner and outer races, and heat resistant plastic rollers with ball-bearings disposed on the inner race. The bearing assembly is driven from its outer race by a continuous drive belt 20 which operatively couples the bearing assembly to a drive motor 18. In this regard, the activation of the drive motor 18 effectively facilitates the rotation of the base 16 due to the operative coupling of the drive motor 18 to the bearing assembly via the drive belt 20.

Disposed on the top surface of the base 16 is a gripper mechanism for maintaining the lens 50 in a prescribed orientation relative to the base 16. The gripper mechanism comprises a plurality (and preferably three) generally L-shaped arms 12. Each of the arms 12 includes a base portion 13 which is pivotally connected to the top surface of the base 16. The base portion 13 of each arm 12 has a generally rectangular configuration defining opposed longitudinally and laterally extending sides. Included on the base portion 13 of each arm 12 adjacent one lateral side thereof is a weight 15. The functionality of the weights 15 of the arms 12 will be described in more detail below.

In addition to the base portion 13, each arm 12 includes an elongate strut portion 17 which extends angularly from the base portion 13. The strut portion 17 of each arm 12 itself has a generally L-shaped configuration, with the distal end portion thereof extending perpendicularly relative to its remainder. Attached to the distal end of the strut portion 17 of each arm 12 is a lens gripper 14. As best seen in FIG. 2, the base portions 13 of the arms 12 are pivotally connected to the base 16 at locations such that the lens grippers 14 disposed on the distal ends of the strut portions 17 are separated from each other at equidistant intervals of approximately one hundred twenty degrees.

In the cleaning apparatus 10 of the present invention, the lens grippers 14 are sized and configured to engage and thus grip the peripheral edge 51 of the lens 50 in the manner shown in FIGS. 1 and 2. Advantageously, the configuration of the lens grippers 14 minimizes the contact area between the arms 12 and the lens 50. Though, as shown in FIGS. 1 and 2, the lens grippers 14 comprise discreet elements which are attached to respective ones of the arms 12, those of ordinary skill in the art will recognize that the strut portions 17 of the arms 12 may be formed to include lens grippers as integral portions thereof.

In order to maintain firm contact between the lens grippers 14 and the peripheral edge 51 of the lens 50, the arms 12 and, in particular, the strut portions 17 thereof, are normally biased radially inwardly toward the axis defined by the base 16. Such bias is facilitated by a biasing spring 22. As shown in FIG. 1, one end of the biasing spring 22 is attached to the top surface of the base 16, with the opposite end of the biasing spring 22 being attached to one segment of a linkage mechanism 23 which is pivotally connected to and mechanically interconnects the base portions 13 of the arms 12 to each other. The linkage mechanism 23, which includes multiple segments interconnecting corresponding pairs of the base portions 13 of the arms 12, is operative to facilitate the application of the biasing force exerted by the spring 22 to each of the strut portions 17 and, hence, all three lens grippers 14.

In order to facilitate the placement of the lens 50 within or between the lens grippers 14, the arms 12 and, in particular, the strut portions 17 thereof, are rotated outwardly to facilitate the movement of the lens grippers 14 radially outwardly relative to the axis of the base 16. The interconnection of the arms 12 to each other via the linkage mechanism 30 causes the outward rotation of a single arm 12 to facilitate the simultaneous outward rotation of the remaining two arms 12. As will be recognized, sufficient force must be applied to one of the arms 12 as necessary to overcome the radially inwardly directed biasing force applied thereto by the biasing spring 22. Those of ordinary skill in the art will recognize that the cleaning apparatus 10 need not necessarily include the linkage mechanism 23, and that the arms 12 may be independent of each other. In this regard, the base portion 13 of each such arm 12 may be attached to one end of a biasing spring 22, with the opposite end of such spring 22 being attached to the top surface of the base 16 such that a total of three biasing springs 22 are included in the cleaning apparatus 10.

The cleaning apparatus 10 of the present invention further comprises a steam conduit 24 which includes a nozzle disposed at its distal end adjacent a lens 50 held within the arms 12. The nozzle of the steam conduit 24 is selectively, pivotally positionable relative to the lens 50. During a cleaning operation, the lens 50 is preferably mounted within the arms 12 such that the top surface 50a thereof, which is normally covered with the wax residue or film, is directed upwardly away from the base 16. The nozzle of the steam conduit 24 is preferably positioned relative to the lens 50 such that steam exiting the nozzle thereof directly impinges the top surface 50a of the lens 50. It is contemplated that the nozzle of the steam conduit 24 may be positioned such that the steam propelled therefrom is applied to both the top and bottom surfaces 50a, 50b of the lens 50, though not necessarily in equal measure. In this instance, the steam exiting the nozzle of the steam conduit 24 can be used to simultaneously clean both the top and bottom surfaces 50a, 50b of the lens 50. During the cleaning operation, the lens 50 is preferably rotated via the rotation of the base 16 in the above-described manner. Advantageously, as the rotational speed of the base 16 increases, the strength of engagement between the lens grippers 14 and peripheral edge 51 of the lens 50 is likewise increased due to the action of the weights 15 disposed on the base portions 13 of the arms 12.

The cleaning of both the top and bottom surfaces 50a, 50b of the lens 50 simultaneously, as opposed to separately, substantially reduces the risk of recontaminating the cleaned side of the lens 50. The temperature of the steam applied to the lens 50 is sufficient to remove typical residue (e.g., the above-described wax residue) from the top and bottom surfaces 50a, 50b of the lens 50. To assist in the residue removal process, it is preferred that a detergent be mixed with the steam. It is contemplated that the mixture of such detergent with the steam will occur at the nozzle of the steam conduit 24. A preferred detergent will have degreasing and surfactant properties well suited for removing common lens contaminants found in an optical laboratory. The steam conduit 24 is preferably fabricated from stainless steel, though other materials may be employed as an alternative. It is also contemplated that hot water may be used as an alternative to steam, with the water being heated to a temperature above the melting point of the residue to be removed from the top and bottom surfaces 50a, 50b of the lens 50.

The cleaning apparatus 10 of the present invention may optionally include a water conduit 26 which also has a nozzle disposed at the distal end thereof and located in close proximity to the lens 50. The water conduit 26, like the steam conduit 24, may be selectively rotated or pivoted to facilitate the placement of the nozzle thereof in a prescribed position relative to the lens 50. The water conduit 26, which is also preferably fabricated from a stainless steel material, is adapted to expel rinse water upon the lens 50 subsequent to the completion of the steam cleaning process described above. Such rinse process can be used to remove any residual detergent that may remain on the top and bottom surfaces 50a, 50b or peripheral edge 51 of the lens 50.

Figure 3:
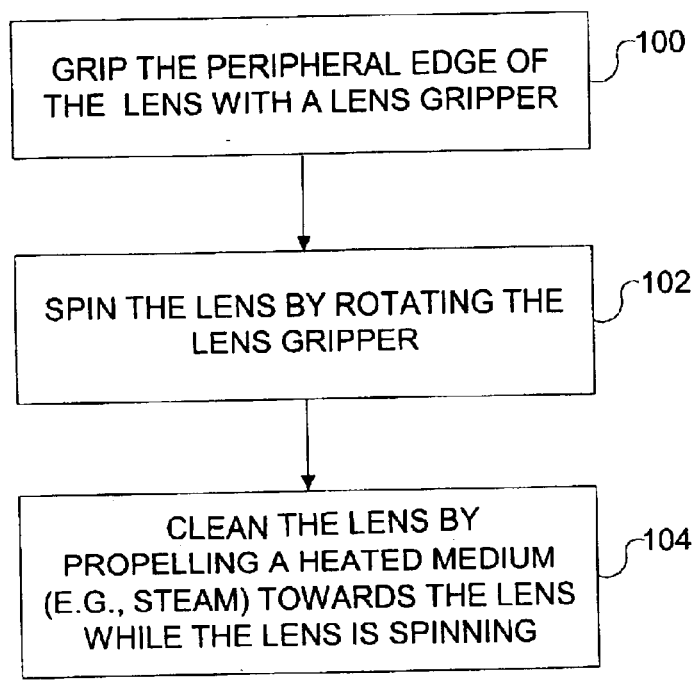
FIG. 3 is a flow chart illustrating exemplary steps for cleaning an optical lens using the optical lens cleaning apparatus shown in FIGS. 1 and 2.

FIG. 3 provides a flow diagram illustrating exemplary steps which may be used for cleaning and polishing the de-blocked optical lens 50 using the above-described cleaning apparatus 10. In step 100, the peripheral edge 51 of the lens 50 is gripped through the use of the lens grippers 14 of the arms 12. As explained in step 102, the lens grippers 14 are then rotated via the rotation of the base 16 by the activation of the drive motor 18, thus in turn rotating the lens 50. As explained in step 104, while the lens 50 is rotating, a heated medium such as steam or hot water is directed towards one or both of the top and bottom surfaces 50a, 50b of the lens 50, thus facilitating the cleaning and polishing thereof. As explained above, detergent is preferably mixed with the steam at the nozzle of the steam conduit 24 for application to the lens 50 while the same is rotating. The spinning or rotating lens 50 may then optionally be rinsed by spraying water thereon from the nozzle of the water conduit 26.

As indicated above, the use of the steam or hot water in the cleaning and polishing operations of the present invention is operative to remove optical blocking materials, such as wax and/or other contaminants (e.g., polish), from the top and bottom surfaces 50a, 50b of the lens 50. The steam, hot water, and/or detergent is heated to a temperature above the melting point of the blocking material prior to being propelled toward the lens 50. By gripping the peripheral edge 51 of the lens 50 with minimal contact, the contamination can be removed thoroughly through this process, with the simultaneous cleaning of both the top and bottom surfaces 50a, 50b reducing the risk of re-contaminating the cleaned side, as indicated above. The non-contact method of cleaning facilitated through the use of the cleaning apparatus 10 of the present invention also reduces the risks of cross-contamination. Spent solutions are not reused, thereby further reducing the risk of re-contamination, with the use of steam making the cleaning apparatus 10 more economical to operate.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A cleaning apparatus for a lens defining opposed top and bottom surfaces and a peripheral edge, the cleaning apparatus comprising:
    a rotatable base;
    at least three arms pivotally connected to the base and rotatable therewith, the arms being configured to releasably engage the lens;
    a linkage mechanism having at least three segments, each of the segments being mechanically connected to and extending between an adjacent pair of the arms to facilitate concurrent movement of the arms; and
    a means for propelling a heated medium towards at least one of the top and bottom surfaces of the lens while the lens is being spun by the rotation of the base and the arms.

2. The cleaning apparatus of claim 1 wherein the arms are configured to releasably engage the peripheral edge of the lens.

3. The cleaning apparatus of claim 2 wherein the heated medium comprises steam.

4. The cleaning apparatus of claim 3 wherein the propulsion means comprises a steam conduit including a dispensing nozzle which is selectively positionable in a prescribed orientation relative to the lens mounted within the arms.

5. The cleaning apparatus of claim 3 wherein the heated medium comprises a mixture of steam and detergent.

6. The cleaning apparatus of claim 2 wherein the heated medium comprises hot water.

7. The cleaning apparatus of claim 2 further comprising a means for applying rinse water to the lens subsequent to the application of the heated medium thereto.

8. The cleaning apparatus of claim 7 wherein the application means comprises a water conduit having a dispensing nozzle which is selectively positionable in a prescribed orientation relative to the lens.

9. The cleaning apparatus of claim 2 wherein each of the arms comprises:
    a base portion pivotally connected to the base;
    an elongate strut portion extending from the base portion and defining a distal end; and
    a lens gripper attached to the distal end of the strut portion and configured to be engagable to the peripheral edge of the lens;
    the lens grippers being movable radially inward toward and radially outwardly from an axis defined by the base.

10. The cleaning apparatus of claim 9 wherein the arms are connected to the base at locations wherein the lens grippers are oriented relative to each other at equidistantly spaced intervals of approximately one hundred twenty degrees.

11. The cleaning apparatus of claim 9 further comprising a biasing means for biasing the lens grippers radially inwardly toward the axis of the base.

12. The cleaning apparatus of claim 11 wherein:
    the linkage mechanism is operative to facilitate the concurrent movement of the lens grippers toward and away from the axis of the base; and
    the biasing means comprises at least one biasing spring operatively coupled to and extending between the base and the linkage mechanism.

13. The cleaning assembly of claim 11 wherein the base portion of each of the arms includes a weight for assisting in the radially inward bias of the lens grippers toward the axis of the base upon the rotation thereof.

14. The cleaning apparatus of claim 2 further comprising a drive motor operatively coupled to the base for facilitating the rotation thereof.

15. A cleaning apparatus for a lens which defines opposed top and bottom surfaces and a peripheral edge, the cleaning apparatus comprising:
    a rotatable base;
    at least three arms pivotably connected to the base and rotatable therewith, the arms being configured to releasably engage the peripheral edge of the lens;
    a linkage mechanism having at least three segment, each of the segments being mechanically connected to and extending between an adjacent pair of the arms to facilitate concurrent movement of the arms; and
    a steam conduit including a dispensing nozzle which is selectively positionable in a prescribed orientation relative to the lens mounted within the arms, the dispensing nozzle being operative to propel steam toward at least one of the top and bottom surfaces of the lens while the lens is being spun by the rotation of the base and the arms.

16. The cleaning apparatus of claim 15 further comprising a water conduit having a dispensing nozzle which is selectively positionable in a prescribed orientation relative to the lens.

17. The cleaning apparatus of claim 15 wherein each of the arms comprises:
   a base portion pivotally connected to the base;
   an elongate strut portion extending from the base portion and defining a distal end; and
   a lens gripper attached to the distal end of the strut portion and configured to be engagable to the peripheral edge of the lens;
   the lens grippers being movable radially inward toward and radially outwardly from an axis defined by the base.

18. The cleaning apparatus of claim 17 wherein the arms are connected to the base at locations wherein the lens grippers are oriented relative to each other at equidistantly spaced intervals of approximately one hundred twenty degrees.

19. The cleaning apparatus of claim 17 wherein the linkage mechanism is operative to facilitate the concurrent movement of the lens grippers toward and away from the axis of the base.

20. The cleaning apparatus of claim 19 wherein at least one biasing spring is operatively coupled to and extends between the base and the linkage mechanism, the biasing spring being operative to bias the lens grippers radially inwardly toward the axis of the base.

21. The cleaning assembly of claim 20 wherein the base portion of each of the arms includes a weight for assisting in the radially inward bias of the lens grippers toward the axis of the base upon the rotation thereof.

22. The cleaning apparatus of claim 15 further comprising a drive motor operatively coupled to the base for facilitating the rotation thereof.

23. A cleaning apparatus for a lens defining opposed top and bottom surfaces and a peripheral edge, the cleaning apparatus comprising:
   a rotatable base;
   a plurality of arms pivotally connected to the base and rotatable therewith, the arms being configured to releasably engage the lens;
   a linkage mechanism having a plurality of segments, each segment mechanically connected to only an adjacent pair of the arms to facilitate concurrent arm movement; and
   a means for propelling a heated medium towards at least one of the top and bottom surfaces of the lens while the lens is being spun by the rotation of the base and the arms.

* * * * *